Patented June 13, 1950

2,511,472

UNITED STATES PATENT OFFICE 2,511,472

METHOD OF APPLYING METALLIC COATINGS ON NONMETALLIC MATERIALS

George J. Kmecik, Philadelphia, Pa.

No Drawing. Application September 19, 1947, Serial No. 775,157

6 Claims. (Cl. 117—160)

This invention relates to methods of applying metallic coatings on non-metallic materials, and more particularly to the production of adherent silver coatings on various materials which are themselves non-conductors of electricity.

The principal object of the present invention is to provide, on a base of organic or synthetic plastic, non-conducting material, a metal coating of silver which will be tenacious and which may be black or mirror-like.

It is a further object of the present invention to provide a coating of silver on the surface of a base of nonmetallic material, and in which the thickness of the coating may be controlled as desired.

It is a further object of the present invention to provide a tenacious mirror-like coating of silver on a synthetic plastic base, the production of the coating being effected in an improved manner.

Other objects and advantageous features of the invention will be apparent from the specification.

In accordance with the present invention, an article, which may be in the form of a sheet, plate, filament, textile fabric, or formed object, consisting of a synthetic plastic or organic, non-conducting material, is provided with the desired coating by the use of a silver salt soluble in an organic solvent. A particularly suitable salt for this purpose is silver perchlorate, $AgClO_4$, hydrated or anhydrous, which is incorporated in a suitable organic solvent for effecting penetration of the silver salt into the surface of the article, or which is contained in an organic coating capable of being applied to the article. Following the penetration by or application of the silver salt, an alkaline reduction of the silver salt is effected and, by the action of the reducing agent, the metal salt is reduced to a black or mirror-like tenacious electroconductive silver.

Among the organic materials, to which the methods of the present invention are particularly applicable, are articles made from cellulose acetate, cellulose nitrate, regenerated cellulose, paper, wood, acrylic resins, glass, leather, rubber, urea-formaldehyde resins, vinyl and polyvinyl resins, and phenol-formaldehyde resins, all of which are non-conductors.

While it is not essential, it has been found that more rapid and more adherent silver coatings may be obtained on synthetic plastic articles, if the article is given a preliminary submersion in a suitable solution to either dissolve or modify the surface of the plastic. This precoating solution may consist of either an aqueous or organic solvent solution capable of dissolving or modifying the surface of the article. Following the application of the preparatory solution, the article to be coated is then dried and the solution of the silver salt applied.

The preliminary treatment may also be used to enhance the brilliance of the coating, and it has been found that, if approximately one-tenth gram of a mercury salt is used in 100 c. c. of the preliminary treatment solution, a brighter coating will be obtained after polishing. The mercury salts employed should preferably be those whose anions do not precipitate silver in the subsequent treatment of the article.

The following examples are illustrative of the invention, but are not to be taken as limiting the application of the coating to the specific steps and agents set forth:

Example I

A solution of silver perchlorate, $AgClO_4$, in benzene, toluene, or other suitable solvent is prepared, the solvent being chosen in accordance with the particular base on which the coating is to be applied. The proportions of the silver salt may be varied, but a concentration of the order of 4% has been found satisfactory. The solution is applied to the material to be coated by immersing the article therein, the temperature of the solution being of the order of 25° C. A coating, deposit or penetration is thus obtained, the thickness of which varies proportionately with the concentration of the silver salt, with the length of time of immersion and with increase of the temperature of the solution. If the temperature of the solution is increased so as to be of the order of 50° C., a shorter time, about one-fifth to one-sixth, of that required at 25° C. will permit of the formation of a comparable coating.

After the desired thickness of coating, deposit or penetration has been applied, the article to be coated is removed or the coating material is drained from the article to be coated and the solvent is permitted to evaporate or is evaporated. The article is then subjected to the action of an alkaline reducing bath. One suitable alkaline reducing bath may consist of the following:

| | Cc. |
|---|---|
| NaOH (20% solution) | 45 |
| Formalin (40% solution) | 10 |
| Water | 120 |

The concentration of this bath may be varied, the relative proportions of the sodium hydroxide and formalin being retained. Also, if a more rapid action is desired, the reducing bath may be heated to a temperature of the order of 40° C. The alkaline reducing bath may also have incorporated therein a suitable wetting agent to aid in the application of the bath to the surface on which it is applied. The wetting agent by permitting gas bubbles tending to form on the surface to leave the surface permits more rapid and complete contact of the reducing bath. An adherent silver deposit, coating or penetration is effected on the surface of the article, and this coating may have a black, silver or mottled appearance and is electroconductive.

If a metallic silver or mirror-like electroconductive silver deposit or coating is required or desired to enhance the formation of the mirror, there is added to or included in the reducing bath just referred to, prior to its use, 1 cc. of triethanolamine.

In place of the sodium hydroxide, potassium hydroxide may be substituted in part or entirely, or sodium carbonate may be employed to replace the sodium hydroxide in part or entirely. Also, in place of the formalin, hydrazine sulfate may be substituted in part or entirely. Further, in place of the triethanolamine, ammonia or any water soluble amine may be substituted in part or entirely.

After the application of the alkaline reducing bath for the desired period of time, the article is then removed from the reducing bath and washed in water, preferably distilled water, to remove corrosive salts that could cause spotting.

Example II

In place of the benzene or toluene, other organic solvents, such as ether, and mixtures of solvents for the silver perchlorate may be employed, or mixtures of organic solvents, such as acetone and methylene chloride, may be employed.

It is preferable that there be no water present in the organic solution of silver perchlorate, but small amounts of water may be present, depending upon the particular organic solvent employed. If the solvent is non-miscible with water, there is a tendency for two layers to form, the lower of which is water containing the major portion of the silver salt. This can be corrected by adding an organic solvent which is miscible with both water and the water immiscible organic solvent, thus forming a complete mixture. Where benzene is used as the solvent for silver perchlorate with water present, a miscible solvent, such as acetone or alcohol, may be used to obtain the complete mixture.

Example III

In the application of the coating to acrylic resins, and particularly methyl methacrylate, in place of benzene, the organic solvent for the silver salt preferably consists of a mixture of acetone and methylene chloride, the article being subjected after the desired deposit, coating or penetration has been effected to the action of a reducing bath, as pointed out above.

Example IV

In the application of the coating to urea-formaldehyde resins, the article is preferably preliminarily roughened by mechanical means, or, if desired, by chemical action, such as by the use of concentrated hydrochloric acid, and the article is subjected, as before, to the solution of silver perchlorate in an evaporable organic solvent. After the desired deposit, coating or penetration has been effected, the article may be subjected to the action of a reducing bath, as pointed out above.

Example V

An organic solution of silver perchlorate may be used as a solvent in the preparation of a cellulose acetate or cellulose nitrate lacquer. The lacquer may contain up to 4% of its weight of the silver salt. The lacquer thus prepared is applied in contact with the article. After evaporation of the solvent, the article is then subjected, as before, to the action of the alkaline reducing solution and washed, and an electroconductive silver coating, deposit or penetration will be provided.

If desired, and in order to provide a more tenacious coating after the solvent has been evaporated, and before the treatment in the alkaline reducing bath, the coated article may be slightly heated to about 100° C. for about 10 minutes. After the treatment in the alkaline reducing bath, the coated article may be washed with water and distilled water, shaken to remove the excess water and again heated for about 10 minutes at about 100° C.

Example VI

If desired, the article to be coated may be preliminarily coated with a nitrocellulose or cellulose acetate lacquer, and the excess solvent permitted to dry. The article is then sprayed with or placed in a bath of a solution of silver perchlorate in benzene. The article is then removed from the spray or bath and the excess solvent permitted to evaporate and the article subjected to the alkaline reducing bath as before.

Example VII

In place of the organic solvents mentioned above other organic solvents may also be employed. A solution of silver perchlorate in a low boiling point water soluble organic solvent containing a smaller amount of a higher boiling point water soluble organic solvent is prepared. One such suitable solution may consist of the following:

| | |
|---|---|
| Alcohol, isopropyl _____cc__ | 100 |
| Glycerine or other water soluble polyhydroxy alcohol _____cc__ | 10 |
| Silver perchlorate _____grams__ | 15 |

Textile fabric of synthetic plastic material, such as acetate rayon, is immersed in this solution for about 15 seconds and removed and the lower boiling point solvent is permitted to evaporate or is evaporated. The fabric is then placed in an alkaline reducing bath as pointed out above. An extremely bright finish silver coating is thus obtained.

Articles with adherent silver coatings, applied in accordance with the present invention, have a wide field of usefulness. The silver coating may serve not only as a decorative coating, but also as a coating suitable for electrodeposits on containers or cases for shielding electronic circuits, and in the production of condensers, the silver serving as a base material for the application of another metal, such as copper, by plating or otherwise.

I claim:

1. The method of applying a metallic silver coating to an article of non-conducting material which includes the step of subjecting the surface of the article to the action of a solution of silver perchlorate in an evaporable organic solvent, permitting the evaporation of the solvent from the surface, and applying an alkaline reducing agent to reduce the silver salt on the surface to metallic silver.

2. The method of applying a metallic silver coating to an article of non-conducting material which includes the step of subjecting the material to be coated to a solution which is a solvent of the material, then subjecting exposed portions of the article to the action of a solution of silver perchlorate in an evaporable organic solvent, permitting the evaporation of the solvent, and applying to said exposed portions an alkaline reducing agent to reduce the silver salt to metallic silver.

3. The method of applying a metallic silver coating to an article of non-conducting material which includes the step of subjecting the surface of the article to be coated to a solvent solution containing a mercury salt, evaporating the solvent solution, then subjecting the surface of the article to the action of a solution of silver perchlorate in an evaporable organic solvent, effecting the evaporation of the solvent, and applying to the surface an alkaline reducing agent to reduce the silver salt to metallic silver.

4. The method of applying a metallic silver coating to an article of non-conducting material which includes the step of subjecting the surface of the article to be coated to the action of a solution of silver perchlorate in an evaporable organic solvent, effecting the evaporation of the solvent, and applying to the surface an alkaline reducing agent to reduce the silver salt to metallic silver, said alkaline reducing agent containing a material having an amine radical as a brightener.

5. The method of applying a metallic silver coating to the surface of an article of non-conducting material which includes the step of applying silver perchlorate in an evaporable organic solvent to the surface of the article to be coated, treating the solution thus applied to permit the retention of the silver salt on the surface of the article and the removal of the solvent, and applying to the surface an alkaline reducing agent to reduce the silver salt to metallic silver.

6. In the applying of metallic silver to non-conducting materials, the method which includes subjecting the material to the action of a vehicle containing silver perchlorate in an organic solvent, permitting the evaporation of the solvent, and applying to the silver salt an alkaline reducing agent to reduce the silver salt to metallic silver.

GEORGE J. KMECIK.

REFERENCES CITED

The following references are of record in the file of this patent:

UNITED STATES PATENTS

| Number | Name | Date |
|---|---|---|
| 2,186,452 | Freund | Jan. 9, 1940 |

FOREIGN PATENTS

| Number | Country | Date |
|---|---|---|
| 284,786 | Great Britain | Feb. 6, 1928 |

OTHER REFERENCES

Uses & Applications of Chemicals & Related Materials, Gregory, vol. 1, June 1939, p. 520.